L. KING.
DRILLING MACHINE.
APPLICATION FILED SEPT. 15, 1919.
1,410,815.
Patented Mar. 28, 1922.
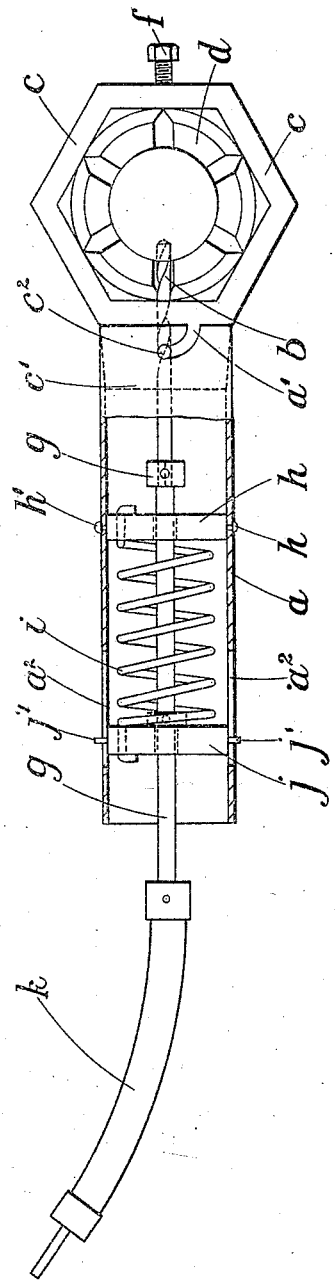
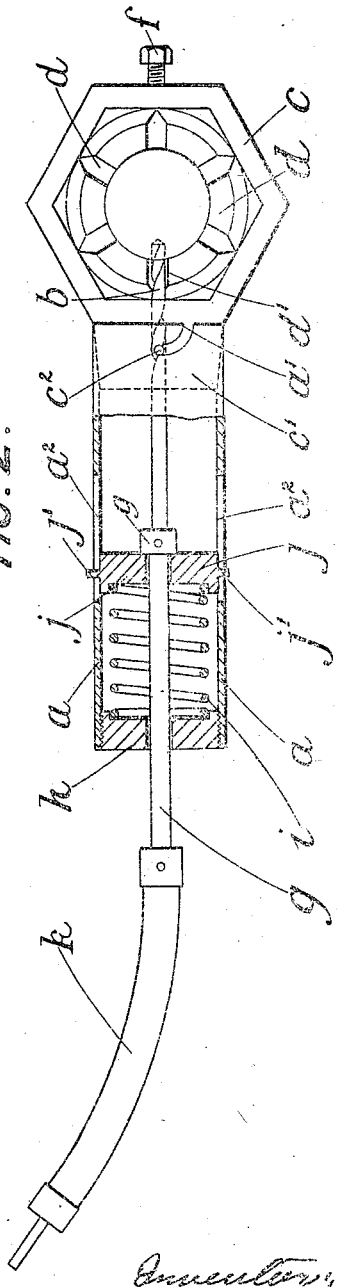
Inventor,
Leonard King
By

UNITED STATES PATENT OFFICE.

LEONARD KING, OF HAMPSTEAD, LONDON, ENGLAND.

DRILLING MACHINE.

1,410,815.  Specification of Letters Patent.  Patented Mar. 28, 1922.

Application filed September 15, 1919. Serial No. 323,940.

*To all whom it may concern:*

Be it known that I, LEONARD KING, a subject of the King of Great Britain, residing at 15 Mackeson Road, Hampstead, in the county of London, England, have invented certain new and useful Improvements in or Relating to Drilling Machines, of which the following is a specification.

This invention relates to drilling tools or implements and has for its chief object to enable bolts to be drilled in situ, more particularly those which are fitted with castle nuts formed with grooves for receiving the ends of a pin passed through the bolt to lock the nut in position.

According to the invention the drilling tools or implement comprises a preferably tubular frame adapted to receive a cage for fitting over and around the nut applied to the bolt required to be drilled, means being provided for holding the cage in position and a slot or opening passing through the cage and the frame to allow of the passage of the drill.

In order that the invention may be clearly understood and readily carried into effect the same will now be more fully described by the aid of the accompanying drawings in which:—

Figure 1 is a sectional plan of the improved tool or implement.

Figure 2 is a similar view to Figure 1 showing a modification hereinafter referred to.

$a$ is the frame and $b$ the drill adapted to be operated therein. $c$ is the cage mounted in or applied to the frame to take over the nut $d$ with grooves $d'$ fitting the bolt $e$ to be drilled. As shown the cage $c$ is of hexagonal shape for engaging the nut $d$, and is adjustably secured in position by means of a screw $f$. The cage $c$ is by preference formed with a conical part $c'$ capable of entering the tubular frame $a$ within which it is detachably secured, by means of the pin $c^2$ on the part $c'$ engaging an arcuate slot $a'$ in the frame. The drill $b$ is mounted in a holder $g$ fitted to slide through a disc-like member $h$ secured to the frame $a$ by pins $h'$, whilst a spring $i$ is secured to the member $h$, and to a similar member $j$ having pins $j'$ which slide in slots $a^2$ in the frame, to furnish the pressure necessary for drilling. For this purpose the member $j$ may be secured to and slide with the holder $g$. In the arrangement shown in Figure 2 the retracting of the drill serves to compress instead of extend the spring $i$ as in Figure 1 and the member $h$ may be fitted by screwing into the end of the frame as shown whilst the member $j$ is moved in one direction by the head of the holder and in the opposite direction by the spring. To the rear of the drill holder means such as a flexible shaft $k$ may be fitted for rotating the drill $b$ thus enabling the tool or implement to be manipulated and used in various positions or under conditions in which it is not feasible to drive the drill direct.

It will be seen that the invention provides a very compact and readily manipulated tool by means of which bolts situated in locations not readily accessible may be bored without being removed and taken to an ordinary drilling machine.

The nut engaging cage being detachable from the frame may be easily removed and replaced by another conforming to the shape of the nut on the end of the bolt to be drilled if necessary.

What I claim and desire to secure by Letters Patent of the United States is:—

1. An implement, for forming a transverse bore in a section of a bolt surrounded by a nut, comprising a cage adapted to completely surround and bear against all of the side faces of the nut, a frame extending from one side of the cage, a drill carried by the frame and movable longitudinally into and from cage on a line transverse to the axis of the bolt, and means for operating the drill.

2. An implement, for forming a transverse bore in a section of a bolt surrounded by a nut, comprising a cage adapted to completely surround and bear against all of the side faces of the nut, a frame extending from one side of the cage, a drill carried by the frame and movable longitudinally into and from the cage on a line transverse to the axis of the bolt, spring means for normally holding the drill retracted from the cage, and means for actuating the drill.

LEONARD KING.